United States Patent [19]

Gunther et al.

[11] Patent Number: 4,575,483

[45] Date of Patent: Mar. 11, 1986

[54] PHOTOGRAPHICALLY USEFUL CHALCOGENAZOLIUM POLYMETHINE DYES

[75] Inventors: Wolfgang H. H. Gunther, Webster; John D. Mee, Rochester, both of N.Y.

[73] Assignee: Eastman Kodak Company, Rochester, N.Y.

[21] Appl. No.: 702,694

[22] Filed: Feb. 19, 1985

[51] Int. Cl.⁴ ............................................. G03C 1/02
[52] U.S. Cl. ................................. 430/588; 430/570; 430/578; 430/581; 430/592
[58] Field of Search ............... 430/588, 592, 578, 581, 430/570

[56] References Cited

U.S. PATENT DOCUMENTS

| | | |
|---|---|---|
| 2,323,503 | 7/1943 | Wilson . |
| 2,339,094 | 1/1944 | Middleton . |
| 4,115,122 | 9/1978 | Adachi et al. ...................... 430/598 |
| 4,239,284 | 5/1982 | Detty et al. . |
| 4,272,614 | 6/1981 | Mifune et al. ...................... 430/600 |
| 4,365,016 | 12/1982 | Detty et al. . |
| 4,365,017 | 12/1982 | Detty et al. . |
| 4,451,557 | 5/1984 | Lok et al. ...................... 430/600 |
| 4,471,044 | 9/1984 | Parton et al. ...................... 430/598 |

FOREIGN PATENT DOCUMENTS 136420 11/1976 Japan .

OTHER PUBLICATIONS

"Un Nouvel Heterocycle Tellure: le Benzisotellurazole-1,2", Campsteyn et al., *Journal of Heterocyclic Chemistry*, vol. 15, Aug. 1978, pp. 745–748.

U.S. Ser. No. 660,155, filed Oct. 12, 1984, commonly assigned, entitled Photographically Useful Chalcogenazoles, Chalcogenazolines, and Chalcogenazolinium and Chalcogenazolium Salts.

*Primary Examiner*—J. Travis Brown
*Attorney, Agent, or Firm*—Carl O. Thomas

[57] ABSTRACT

Polymethine dyes are disclosed containing a tellurazolium nucleus which is substituted at its 2-position with methine chain which is in turn substituted at its $\beta$ position with a dye property modifier. These dyes can be used in photographic elements to facilitate image formation.

48 Claims, No Drawings

PHOTOGRAPHICALLY USEFUL CHALCOGENAZOLIUM POLYMETHINE DYES

FIELD OF THE INVENTION

This invention is directed to certain novel chalcogenazolium dyes, to intermediates for their preparation, to radiation sensitive silver halide emulsions and photographic elements containing these chalcogenazolium dyes, and to methods for producing images with the photographic elements.

BACKGROUND OF THE INVENTION

Polymethine dyes containing one or more chalcogenazolium nuclei have been widely employed in photography. These dyes have found particular utility as spectral sensitizers for silver halide photographic emulsions. Such emulsions depend on the ability of silver halide microcrystals or grains to form a latent image by absorbing light on imagewise exposure. Unfortunately, the native sensitivity of silver halide grains does not extend beyond the blue portion of the visible spectrum. To record longer wavelength green, red, or infrared (collectively referred to as minus blue) exposures, it is known to adsorb to the surface of the silver halide grains a spectral sensitizing dye capable of absorbing light of these longer wavelengths, thereby extending the latent image forming capability of the grains. In many instances the dye also reduces the sensitivity of—that is, tends to desensitize—the silver halide grains to a significant extent within the spectral region of native sensitivity.

In polymethine sensitizing dyes electromagnetic radiation absorption maxima are shifted bathochromically as the number of methine linking groups is increased. For example, monomethine cyanine dyes, those having a single methine group linking the basic nuclei, typically exhibit absorption maxima in the blue region of the spectrum. Cyanine dyes having absorption maxima in the green and red regions of the spectrum are typically carbocyanine dyes—i.e., dyes with three methine groups linking the basic nuclei; and cyanine dyes having absorption maxima in the infrared typically contain five or more methine groups linking the basic nuclei. Lengthening the methine chain joining the dye nuclei, though the most common approach to bathochromically extending absorption, suffers a notable disadvantage in that it also tends to increase desensitization.

It has been observed in the art that marked bathochromic shifts in absorption maxima occur that cannot be accounted for merely in terms of the chain length of methine linking groups. Such bathochromic shifts have been attributed to aggregation of the dye molecules. Aggregation producing a bathochromic shift, e.g. J aggregation, can be particularly advantageous on the silver halide grain surfaces. Among the most successfully employed aggregating dyes are carbocyanine dyes containing a chalcogen atom in one or more nuclei. It has been observed that substitution of the central or meso carbon atom of the methine chain linking the nuclei can markedly improve aggregation of these dyes. Chain substitutions of polymethine dyes also have utility in modifying other properties, such as oxidation characteristics.

It is known that a bathochromic shift in absorption maxima of up to 5 nm per nucleus can be realized when a selenium atom is substituted for a sulfur atom in a chalcogenazolium dye nucleus. Thus, with a symmetrical simple cyanine dye a bathochromic shift of the absorption peak of up to 10 nm can be realized by substituting selenium for sulfur in both nuclei.

Although Wilson U.S. Patent 2,323,503 extends generic ring formulae to include tellurazole nuclei as extrapolations of investigations of other chalcogenazole methylene color formers, the true state of the art is summed up by Middleton U.S. Pat. No. 2,339,094:

It may be observed that the difficulty of reaction resulting in the production of azoles containing members of the oxygen group of elements in the azole ring may vary greatly with different elements, becoming greater in proceeding from the non-metallic elements such as oxygen and sulfur to the more strongly metallic elements such as selenium and tellurium. This probably accounts for the fact that many of the oxazoles and thiazoles have been known for years while the preparation of most of the selenazoles has been accomplished more recently and some of them are still unknown although the corresponding oxazoles and thiazoles are known. Furthermore, the tellurazoles from the simplest to the more complex derivatives have not been described up to the present time.

While the art has heretofore been unsuccessful in preparing tellurazolium salts and their derivatives, it should be noted that divalent tellurium atoms have been placed in other ring structures. Benzisotellurazole-1,2 is described in "Un Nouvel Heterocycle Tellure: le Benzisotellurazole-1,2", by Campsteyn et al, *Journal of Heterocyclic Chemistry*, Vol. 15, August 1978, pp. 745-748. Unfortunately no derivative of benzisotellurazole-1,2 is disclosed. Without a 3 position substituent the ring structure is itself severely restricted as a possible photographic addendum. Further, in general isochalcogenazoles are less desirable and more infrequently suggested for use as photographic addendum than the corresponding chalcogenazoles, since the chalcogen to nitrogen bond in the ring is a potential source of instability.

Tellurium atoms have been incorporated in ring structures other than azole rings of various dyes. Japanese Kokai No. 136420, laid open Nov. 25, 1976, discloses a 1-tellura-3,5-cyclohexanedione nucleus in a merocyanine sensitizing dye in a silver halide emulsion. Detty et al U.S. Pat. No. 4,329,284 discloses 1,2-oxachalcogenol-1-ium salts, wherein the chalcogen can be tellurium or selenium, to be useful in photoconductive compositions. Detty et al U.S. Pat. Nos. 4,365,016 and '017 disclose tellurapyrylium dyes for use in photoconductive compositions.

Gunther et al U.S. Ser. No. 660,155, filed Oct. 12, 1984, titled PHOTOGRAPHICALLY USEFUL CHALCOGENAZOLES, CHALCOGENAZOLINES, AND CHALCOGENAZOLINIUM AND CHALCOGENAZOLIUM SALTS, commonly assigned, discloses for the first time procedures for obtaining tellurium atom containing heterocyclic ring structures useful for the preparation of polymethine dyes. However, Gunther et al contains no teaching directed to preparing such polymethine dyes with methine chain carbon atom substitution.

SUMMARY OF THE INVENTION

In one aspect this invention is directed to a polymethine dye containing as a nucleus thereof an aromatic ring and, fused with said aromatic ring, a tellurazolium ring substituted at its 2-position with a methine chain, wherein the carbon atom of the methine chain which is in the β position with respect to the tellurazolium ring is substituted with a dye property modifier.

In another aspect this invention is directed to a radiation sensitive silver halide emulsion comprised of a dispersing medium, radiation sensitive silver halide grains, and, adsorbed to the surface of said silver halide grains, a polymethine dye as described above.

In still another aspect this invention is directed to a photographic element comprised of a support, at least one radiation sensitive silver halide emulsion layer located on said support, and a polymethine dye located to facilitate photographic image formation containing as a nucleus thereof an aromatic ring and, fused with the aromatic ring, an azolium ring containing a divalent tellurium atom in its 1-position and substituted at its 2-position with a methine chain, the carbon atom which is in the β position with respect to the azolium ring of the methine chain being substituted with a dye property modifier.

The dyes of this invention offer advantages over the prior state of the art. By combining in a single polymethine dye both a tellurazolium nucleus and a methine chain substituent a novel and highly advantageous dye is produced. The inclusion of tellurium instead of another chalcogen in the nucleus allows a bathochromic shift in absorption to be realized. The presence of the methine chain substituent allows further modification of properties. For example, when the polymethine dye is a carbocyanine dye, substitution of the meso carbon atom of the methine chain can promote J aggregation andh allow a further bathochomic shift beyond that imparted by the tellurazolium nucleus. This obviates any necessity of increasing the number of methine groups in the chain, with the resulting tendency toward desensitization. Rather, the dyes of this invention have been observed to exhibit no more than minimal desensitization levels while being highly efficacious spectral sensitizers for silver halide emulsions in the minus blue region of the spectrum. Dyes according to the present invention can be formed capable of absorbing in the red, particularly the longer wavelength red, and infrared portions of the spectrum.

Thus, silver halide emulsions and photographic elements according to this invention containing these dyes are useful for imaging, particularly in the longer wavelength regions identified. In addition, high extinction coefficients are realized with the dyes of the present invention. This can be advantageous in allowing lower levels of dye to be employed to achieve a desired level of radiation absorption. The dyes of this invention can function in emulsion and other layers of photographic elements as inter-grain absorbing, antihalation, and filter dyes.

DESCRIPTION OF PREFERRED EMBODIMENTS

The polymethine dyes of the present invention contain an aromatic ring portion and, fused with the aromatic ring portion, a tellurazolium ring substituted at its 2-position with a polymethine chain, wherein the carbon atom of the polymethine chain which is in the β position with respect to the tellurazolium ring is substituted with a dye property modifier. These dyes are hereinafter referred to as β position substituted tellurazolium polymethine dyes. The specific choice of a β position substituent is determined by the dye property desired for a specific application. In general, any polymethine dye substituent known to be useful in the β position with respect to a conventional chalcogenazolium nucleus (e.g., an oxazolium, thiazolium, or selenazolium nucleus, optionally containing one or more fused aromatic rings) can serve as the dye property modifier. Since β position substitution rarely fails to modify dye characteristics, it is appreciated that the selection is broad, tempered only by basal considerations, such as steric properties, stability in the environment of use, and synthetic convenience.

In applications in which dye aggregation is desired, β position substituents can be chosen from among alkyl substituents, preferably those of from about 1 to 6 carbon atoms, such as methyl, ethyl, i-propyl, n-propyl, i-butyl, n-butyl, and t-butyl. Aromatic substituents are also useful for this purpose. For example, optionally substituted aryl substituents of from 6 to about 10 or more carbon atoms, such as phenyl, tolyl, naphthyl, and indenyl, are recognized to be useful in promoting aggregation.

Heterocyclic aromatic groups are specifically recognized to be useful β position substituents. Such heterocyclic aromatic groups can range from simple five or six membered rings, such 2-thienyl or 3-thienyl, to more elaborate forms. In one form of this invention the polymethine dyes are allopolar dyes, which contain in addition to a tellurazolium nucleus a conventional cyanine and a conventional merocyanine dye nucleus. Allopolar dyes can be viewed as cyanine dyes which have been modified by substitution in the β position by a ketomethylene group—i.e., a merocyanine dye nucleus; or the dyes can be viewed as merocyanine dyes which been modified by substitution in the β position by a 2-methine azolylidene or azinylidene nucleus of the type found in cyanine dyes. In polar solvents and typically in gelatino-silver halide emulsions allopolar dyes resemble in their properties, including aggregation, cyanine dyes, but more closely resemble merocyanine dyes in nonpolar solvents.

In the foregoing description and throughout the tellurium atom containing nucleus of the dye is for convenience referred to as a tellurazolium nucleus. It is, of course, appreciated that in a polymethine dye this nucleus forms a tellurazolium ring in one resonance extreme and a tellurazolinylidene ring in another resonance extreme. Where a second basic heterocyclic ring of the type found in cyanine dyes is present in the dye structure, it is referred to as a azolylidene or azinylidene, recognizing that this is one resonance extreme. Where an acidic merocyanine nucleus is present in the dye structure, it is for convenience described by reference to its keto form.

The β position substituted tellurazolium polymethine dyes of this invention cannot be synthesized by procedures employed for the preparation of corresponding chalcogenazolium dyes. Difficulties arise both in the formation of the tellurazolium nucleus and in β position substitution.

A useful material for preparing the β position substituted tellurazolium polymethine dyes of this invention is a tellurazolium nucleus according to the general formula

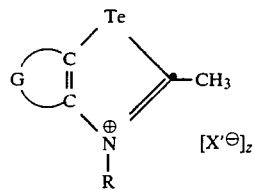

wherein

G represents the atoms completing a fused aromatic nucleus;

R represents a quaternizing substituent;

X' represents an anion; and z is 0 or 1, as required to provide charge neutrality.

To prepare the quaternized tellurazolium nucleus of formula (I) it is usually most convenient to prepare a protonated tellurazolium nucleus differing from formula (I) in that hydrogen occupies the position of R. The tellurazolium salt can be deprotonated by treatment with a base to form the corresponding tellurazole. The tellurazole can be converted to the corresponding tellurazoline by a conventional 2,3-addition reaction. A quaternizing agent can then be employed to convert the tellurazole to the corresponding quaternized tellurazolium salt of formula (I).

A first process for preparing a protonated tellurazolium salt described above employs a starting material of the following formula:

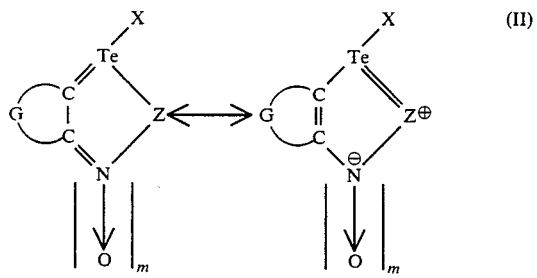

wherein

G is as previously defined;

m is 0 or 1;

X is halogen or a pseudohalogen;

Z is —O— or —N(R')—, and

R' is an aromatic nucleus.

When m is zero and Z is —N(R')—, the starting material can be (2-phenylazophenyl-C,N')-tellurium(II) chloride, the preparation of which is described by Cobbledick et al, "Some New Organotellurium Compounds Derived from Azobenzene: The Crystal and Molecular Structure of (2-Phenylazophenyl-C,N')tellurium(II) Chloride", *Journal of Chemical Research*, pp. 1901–1924, 1979. Although Cobbledick et al employed chloride as the halogen corresponding to X in formula (II), it is apparent from the reported synthesis that X can be halogen (employed here and elsewhere to designate generically chloride, bromide, or iodide) or a pseudohalogen (i.e., one of the recognized class of substituents known to approximate the substituent properties of halogen), such as a cyano, thiocyanate, or hydroxy substituent. Similarly, G and R' can be varied merely by substituting for one or both of the phenyl groups employed in the phenylazophenyl employed by Cobbledick et al an alternative aromatic nucleus. In general the aromatic nuclei, which form G in each of its various occurrences and are referred to in other occurrences variously as aromatic rings, nuclei, or aryl groups or moieties, are preferably carbocyclic aromatic nuclei having from 6 to 20 carbon atoms, most preferably a phenyl or naphthyl or, in the fused form, a benzo or naphtho, nucleus. In some instances an aromatic nucleus can be fused through a five membered ring, as is illustrated by acenaphthylene fused at its 1,2 ring edge. Since R' has little influence on the reaction and is not incorporated in the final product, R' can take a particularly wide variety of aromatic forms, but is generally most conveniently chosen from among the preferred forms of carbocyclic aromatic nuclei described above.

In an alternative form the first process can employ a starting material according to formula (II) in which m is zero and Z is oxygen. This compound can be formed by placing in solution an optionally substituted α-tetralone, hydrochloric or hydrobromic acid, tellurium dioxide, and hydroxylamine. This reaction has the advantage that all of the required materials are readily available at relatively low cost. Alcohols are convenient solvents for the reaction, although other nonreactive organic solvents can be employed. Heating is not required, but can accelerate the reaction. The material of formula (II) forms a solid phase which can be separated by routine filtering and washing steps. Both unsubstituted α-tetralone and various substituted derivatives are useful. Preferred α-tetralones can be represented by the formula:

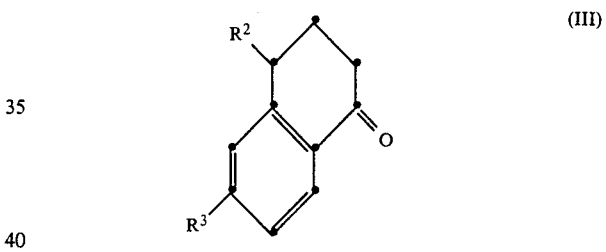

wherein $R^2$ and $R^3$ are independently selected from among hydrogen, halogen, alkyl, and alkoxy. Since $R^2$ and $R^3$ are naphtho ring substituents in the tellurazolium salt ultimately produced, it is apparent that the number of carbon atoms in the alkyl and alkoxy substituents can be widely varied. Instead of employing an α-tetralone, as described above, it is possible to employ a substituted or unsubstituted acenaphthen-1-one.

In general alkyl substituents and moieties of the tellurazolium salts and their derivatives are limited only by physical considerations, such as solubility, mobility, and molecular bulk. Generally alkyl and other aliphatic moieties of the tellurazolium salts and their derivatives of this invention are contemplated to contain up to 18 or more carbon atoms. Since increasing molecular bulk, except as sometimes required to reduce mobility, is seldom desirable in photographic applications, the preferred aliphatic hydrocarbon moieties contain up to 6 carbon atoms, with the lower alkyls (i.e., methyl, ethyl, propyl, and butyl) being preferred. In general, references to cycloalkyl indicate groups having 4 to 10 carbon atoms in a ring, with 5 or 6 ring carbon atoms being preferred.

Instead of preparing the starting material of formula (II) wherein m is zero and Z is oxygen in the manner described above, an oxime of an α-tetralone or acenaphthen-1-one described above can be reacted with tellurium tetrahalide, preferably tellurium tetrachloride or tellurium tetrabromide. In this and subsequent descriptions of employing tellurium tetrahalides as reactants it should be borne in mind that similar results can usually be obtained, before or during the α-tetralone or acenaphthen-1-one reaction, by reacting a soluble halide salt, such as an alkali or alkaline earth halide, with tellurium dioxide. A carboxylic acid can be employed as a solvent for the reaction, and the reaction can be accelerated by heating. The starting material of formula (II) forms a solid phase which can be separated by routine filtering and washing procedures. The preferred α-tetralone oximes correspond to the preferred α-tetralones and can be represented by the formula:

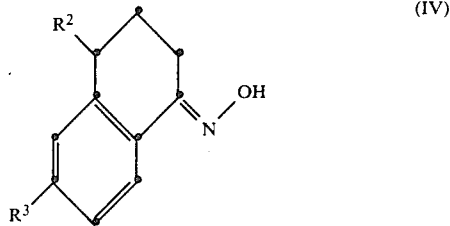

wherein $R^2$ and $R^3$ are chosen as described above.

In a third general form of the starting material of formula (II) m can be 1 and Z oxygen. This form of the starting material of formula (II) can be prepared by reacting with tellurium tetrahalide a carbocyclic aromatic compound activated for electrophilic substitution. Although naphthalene is illustrative of a fused ring carbocyclic aromatic compound that has been activated for electrophilic substitution, it is generally easiest to activate benzene. Activation can be achieved by employing electron donating substituents, such as hydroxy, hydroxyalkyl, alkyl, alkoxy, aryloxy, hydroxyaryl, amino, and groups of similar negative Hammett sigma values, singly or in combination. The reaction can be carried out in an organic solvent such as a liquid hydrocarbon (e.g., benzene or cyclohexane), a halohydrocarbon (e.g., chlorobenzene or chloroform), a nitrohydrocarbon (e.g., nitromethane), or acetonitrile while heating to reflux. Formation of the starting material of formula (II) can be completed by nitrating and then treating with a mild reducing agent. Strong reducing agents can be employed up to, but not exceeding, precisely stoichiometric concentrations. It is generally preferred to employ a mild or dilute reducing agent. Nitric acid in a suitable diluent, such as water or carboxylic acid, can be used for nitrating while hypophosphorus acid can be employed as the mild reducing agent. The synthetic route described above can be modified by a preliminary treatment with the mild reducing agent before nitrating and employing a strong nonoxidizing acid after nitrating and before employing the mild reducing agent a second time. In general the strong nonoxidizing acids contemplated for use in this and other steps of the preparation procedures herein described include acids such as hydrochloric acid, hydrobromic acid, sulfuric acid, fluoroboric acid, a sulfonic acid, and phosphoric acid.

A particularly preferred starting material prepared by the process described in the preceding paragraph can be represented by the formula:

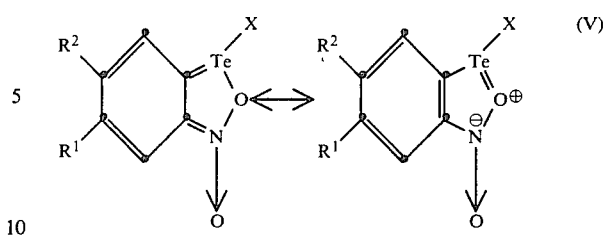

wherein at least one of $R^4$ and $R^5$ and preferably both are chosen from among hydroxy, hydroxyalkyl, alkyl, alkoxy, aryloxy, hydroxyaryl, and amino groups. Alternatively, $R^1$ and $R^2$ together can form an alkanediyldioxy linkage—e.g., a —O—$(CH_2)_n$—O— linkage, where n is preferably from 1 to 3. X is halogen or pseudohalogen, as previously described.

Once the starting material of formula (II) has been prepared, regardless of the choice of alternative preparation routes described above chosen, it is treated with a strong alkaline reducing agent, such as an alkali borohydride (e.g., lithium, sodium, or potassium borohydride). The reaction product is then acylated with an acetyl halide or acetic anhydride. It is apparent that the α carbon atom of the acetyl moiety provides the 2-position methyl substituent in the protonated and quaternized tellurazolium salt produced. The 2-position methyl group serves the important purpose of providing a favored reaction site on the tellurazolium ring of the salt ultimately produced.

Though not isolated, it is believed that acetylation produces a tellurazoline. To avoid opening the tellurium containing ring, the additional step of producing the stable corresponding protonated tellurazolium salt is undertaken by treatment with a strong nonoxidizing acid, such as any of those mentioned above.

A second process for preparing a protonated tellurazolium salt as described above employs a starting material employed for this process is represented the following formula:

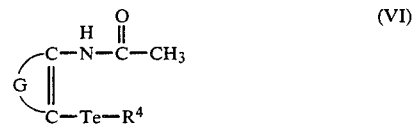

wherein:
G is as previously described and
$R^4$ represents a leaving group.

$R^4$ in formula (VI) forms no part of the protonated tellurazolium salt ultimately produced. Thus, $R^4$ can take the form of any convenient group that can be displaced upon treatment with phosphoryl chloride to permit ring closure. Treatment with phosphoryl chloride eliminates Cl—$R^4$. Thus, any group that can be eliminated as the chloride can be chosen as the leaving group. For example, $R^4$ can be chosen from among hydrocarbon moieties, such as alkyl, cycloalkyl, alkaryl, aryl, aralkyl, and various substituted derivatives, such as those containing alkoxy, alkylthio, halo, amino, amido, and similar substituents. Since $R^4$ forms no part of the protonated tellurazolium salt ultimately produced, it is generally most convenient to select $R^4$ from among lower alkyl substituents.

The starting material of formula (VI) can be prepared from known tellurium compounds by several alternative procedures. One preferred approach is to start with a compound according to formula (II) in which m is zero and Z is —N(R')—, as previously described. This compound is treated with a strong alkaline reducing agent, such as previously described. Thereafter, acetylation is performed. This produces the material of formula (VI). To produce the starting material of formula (VI) by another procedure, after treating with a strong alkaline reducing agent, the reaction product is reacted with X-R⁴, where X is halide, and then acetylated.

A third process for preparing a protonated tellurazolium salt as described above comprises employing a starting material according to the following formula:

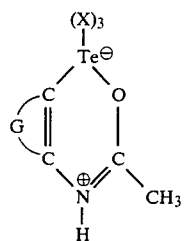

wherein
G is as previously defined and
X is halogen or a pseudohalogen.

The starting material is reacted with a strong alkaline reducing agent, such as described above, and the resulting product is reacted with a strong nonoxidizing acid, such as also described above, to produce the desired protonated tellurazolium salt.

The compound of formula (VII) can be prepared in the following manner: A compound according to the following formula is employed as a starting material:

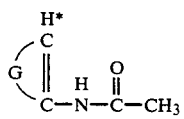

wherein:
G is as previously defined.

When the compound of formula (VIII) is melted or heated in a suitable solvent (e.g., acetonitrile, butyronitrile, or chloroform) with tellurium tetrachloride or tellurium tetrabromide, the material of formula (VII) is produced. Heating to a temperature of at least 60° C. up to about 140° C. is contemplated, with temperatures of from about 110° C. to 120° C. being preferred. In part the reaction to produce the material of formula (VII) is accomplished by choosing G in formula (VIII) so that the aromatic nucleus which it completes is activated in the position ortho to the amido substituent. This can be accomplished by including in the aromatic nucleus one or more substituents capable of directing ring substitution in formula (VIII) to the ring position of the starred activated hydrogen atom. For carbocyclic aromatic rings, such as benzene and naphthene rings, useful substituents can be chosen from among aliphatic and aromatic groups comprised of hydrocarbon moieties (e.g., alkyl, aryl, alkaryl, or alkaryl) optionally linked through a divalent oxygen or sulfur atom (e.g., an alkoxy, aryloxy, alkaryloxy, alkaryloxy, alkylthio, arylthio, alkarylthio, or alkarylthio group); an amino group, including primary, secondary and tertiary amines; an amido group (e.g., acetamido and butyramido); a sulfonamido group (e.g. an alkyl or arylsulfonamido group); a sulfamoyl group (e.g. an alkyl or arylsulfamoyl group); a ureido group (e.g., 1-ureido, 3-phenyl-1-ureido; and 3-methyl-1-ureido); a thioureido group (e.g., a thioureido group corresponding to the above exemplary ureido groups); hydroxy; or a —C(O)M group or —S(O)₂M, wherein M is chosen to complete an acid, ester, thioester, or salt—e.g., —C(O)OH, —C(O)OCH₃, —C(O)SCH₃, —C(O)ONa, —S(O)₂OH, —S(O)₂OCH₂C₆H₅, or —S(O)₂OLi. The aromatic nucleus completed by G can progress unaltered from the compound of formula (VIII) to the protonated tellurazolium salt sought as a product.

To obtain the tellurazole corresponding to the protonated tellurazolium salt prepared as described above treatment with a base, such as ammonium hydroxide, an alkali hydroxide, or an alkali carbonate or bicarbonate, can be undertaken. Procedures for performing the same operation on known protonated chalcogenazolium salts are directly applicable.

To convert the tellurazole to the corresponding quaternized heterocyclic ammonium salt, as indicated by formula (I), the tellurazole is reacted with a quaternizing agent. In a preferred form the quaternizing agent is a sulfonic acid ester containing the quaternizing radical as the base derived moiety of the ester. Specifically preferred quaternizing agents are strong quaternizing agents, such as poly(fluoro)alkylsulfonic acid esters, such as aryl, alkenyl, alkynyl, aralkyl, or alkaryl esters of poly(fluoro)alkylsulfonic acid. Perfluorinated alkylsulfonic acid esters are particularly preferred quaternizing agents (e.g., trifluoromethylsulfonic acid esters). Arylsulfonic acid esters, such as para-toluenesulfonic acid esters, are also strong quaternizing agents. 1,3,2-Dioxathiane-2,2-dioxide and 1,3,2-dioxathiolane-2,2-dioxide have also been demonstrated to be useful quaternizing agents. Including electron donating ring substituents in the aromatic nuclei forming G facilitates quaternization while strongly electron withdrawing substituents require strong quaternizing agents to be employed when quaternization occurs after tellurazole ring formation.

The anion X' shown associated with the tellurazolium salt in formula (I) is usually the anion of the last acid employed in the process. However, it is apparent that conversion from one anion to another can be easily accomplished and that the anion of the tellurazolium salts of this invention can be varied widely. If R contains a negatively charged moiety, as is the case when R is a sulfoalkyl group, for example, then no anion X' is required to provide charge neutrality, and X' need not be present—i.e., z in formula (I) is zero.

A very advantageous approach for preparing quaternized tellurazolium salts according to formula (I) is to employ a starting material according to formula (II) wherein m is zero, indicated specifically by the following formula:

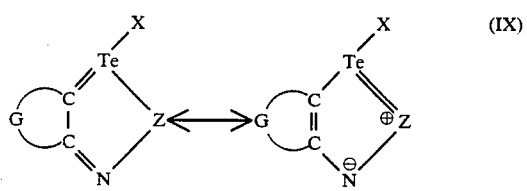

wherein
G, X, and Z are as previously defined.

The starting material is first treated with a strong alkaline reducing agent, which can be selected from among those described above. The reaction product is then treated with an oxidizing agent, such as air, oxygen, a peroxide, a disulfide, or a sulfoxide, to produce

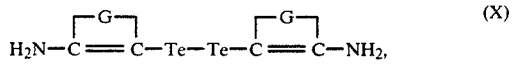

which is treated with an aldehyde, treated with a strong alkaline reducing agent, such as described above, and then treated with an acetylating agent, as described above, and a strong nonoxidizing acid, also as described above. Although treatment with an oxidizing agent is preferred, no separate oxidizing step is required. Ambient air will spontaneously perform such oxidation, and treatment with the aldehyde is sufficient in an inert atmosphere. Following this synthetic approach a variety of quaternizing substituents can be introduced in the salt of formula (I) in addition to those provided by strong quaternizing agents, merely by appropriate selection of the aldehyde. Thus, R can take the form of an optionally substituted hydrocarbon residue of an aldehyde quaternizing substituent, such as alkyl, alkenyl, alkynyl, or aralkyl moieties as well as substituted derivatives, such as oxy, thio, sulfo, sulfonyl, sulfato, halo, or carboxy substituted derivatives, often incorporated to modify solubility or other physical properties. Sulfoalkyl and sulfatoalkyl quaternizing substituents having from 1 to 6 carbon atoms are specifically preferred.

To prepare conventional $\beta$ position substituted chalcogenazolium polymethine dyes corresponding to the $\beta$ position substituted tellurazolium polymethine dyes of this invention, it is conventional practice to begin with a chalcogenazolium salt similar to formula (I), but with a sulfur or selenium atom rather than tellurium present, to acylate under basic conditions to produce 2-acylmethylene chalcogenazolinylidene salt. Unfortunately, this synthetic step has not been successfully accomplished employing the tellurazolium salts of formula (I).

Thus, in order to prepare $\beta$ position substituted tellurazolium polymethine dyes a novel synthetic route has been devised to reach the corresponding 2-acylmethylene tellurazolinylidene salt. This is accomplished by reacting the tellurazolium salt of formula (I) in a suitable solvent at an elevated temperature with a compound of the following formula:

$$R^5-C-A(R^6)_3 \quad (XI)$$

wherein
$R^5$ is a moiety capable of providing the desired dye property modifying substituent and
$R^6$ is an oxy substituent.

$R^5$ can take the form of any known $\beta$ position substituent of a chalcogenazolium polymethine dye and can take any of the specific forms previously described in connection with the $\beta$ position substituted tellurazolium polymethine dyes of this invention. The oxy substituent forms no part of the completed dye and can be any synthetically convenient oxy substituent. That is, it need only be stable under processing conditions and compatible with solution processing. $R^6$ is most conveniently an alkoxy group, such as a lower alkoxy group containing from about 1 to 4 carbon atoms. m-Cresol is an exemplary useful solvent. Sufficient heat is applied during the reaction to displace two hydrogen atoms from the 2-methyl substituent of the tellurazolium salt, resulting in the formation of two moles of an alcohol for each mole of tellurazolium salt of the following formula:

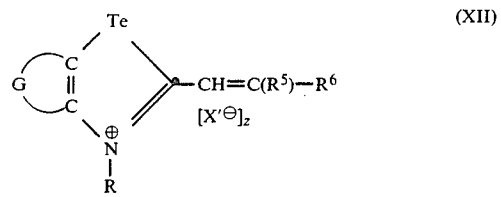

Production of the desired 2-acylmethylene tellurazolinylidene is achieved by hydrolysis with a strong, nonoxidizing acid, such as described above, with the application of heat. This is followed by neutralization with a mild base, such as sodium acetate. Treatment with phosphoryl chloride converts the 2-acylmethylene substituent to a corresponding $\beta$-chloro-$\beta$-$R^5$-ethenyl substituent while concurrently converting the nucleus from a tellurazolidene to a tellurazolium nucleus.

Once a 2-($\beta$-chloro-$\beta$-$R^5$-ethenyl)tellurazolium salt is produced, synthesis of the desired $\beta$ position substituted tellurazolium polymethine dye can proceed employing any of the various techniques known to be useful in the synthesis of conventional polymethine dyes containing a chalcogenazolium nucleus. For example, merocyanine dyes can be formed by the displacement of the $\beta$ position chloro substituent with a ketomethylene nucleus and the elimination of acid. Similarly, cyanine dyes can be formed by reacting an azolium or azinium nucleus substituted in the 2-position with a leaving group, such as a merocapto, sulfo, or iodo group.

In a specifically preferred form the polymethine dyes of this invention are cyanine and merocyanine dyes which are substituted in a methine chain linkage between nuclei, substitution being in the $\beta$ position with respect to the tellurazolium nucleus. The dyes can contain two nuclei joined through a methine chain, which is the most common occurrence, or three or more nuclei, as in complex cyanine or merocyanine dyes. In addition to the above, the polymethine dyes of this invention can take the form of $\beta$ position substituted hemicyanine, styryl, neocyanine, azacyanine, and allopolar cyanine or merocyanine dyes. Such dyes according to the invention are direct analogues of conventional $\beta$ position substituted dyes in these classes, the difference being the presence of a divalent tellurium atom in place of another divalent chalcogen.

One preferred class of cyanine dyes according to this invention are carbocyanine dyes having the meso carbon atom of the methine chain substituted, as indicated by the following formula:

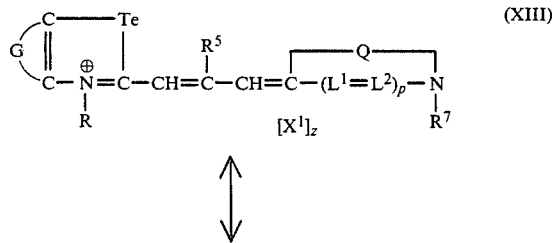

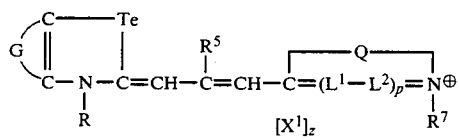

wherein

G represents a fused benzo or naphtho nucleus;

R and $R^7$ independently represent quaternizing substituents;

$R^5$ represents a dye property modifier;

Q represents the atoms completing a basic azole or azine nucleus;

$X^1$ represents a counterion; and z is zero or a positive integer chosen to balance ionic charge.

Generally any basic azolinylidene or azinylidene nucleus satisfying formula (XIII) can be employed in combination with the novel tellurazolium nucleus. It is specifically contemplated that Q can be chosen from among benzotellurazolinylidene, naphthotellurazolinylidene, 2- or 4-pyridylidene, imidazopyridylidene, 2- or 4-quinolinylidene, 1- or 3-isoquinolinylidene, benzoquinolinylidene, thiazoloquinolinylidene, imidazoquinolinylidene, 3H-indolylidene, 1H or 3H-benzindolylidene, oxazolinylidene, oxazolidinylidene, benzoxazolinylidene, naphthoxazolinylidene, oxadiazolinylidene, thiazolidinylidene, phenanthrothiazolinylidene, acenaphthothiazolinylidene, thiazolinylidene, benzothiazolinylidene, naphthothiazolinylidene, tetrahydrobenzothiazolinylidene, dihydronaphthothiazolinylidene, thiadioxazolinylidene, selenazolinylidene, selenazolidinylidene, benzoselenazolinylidene, naphthoselenazolinylidene, selenadiazolinylidene, pyrazolylidene, imidazolinylidene, imidazolidinylidene, benzimidazolylidene, naphthimidazolinylidene, diazolinylidene, tetrazolinylidene, and imidazoquinoxalinylidene nuclei. The nuclei can be substituted in any conventional manner consistent with formula (XIII). $R^7$ can, for example, be any conventional quaternizing group and can be chosen from among any of the various forms of R described above.

In certain optimum forms R and $R^7$ are sulfo or sulfato substituted hydrocarbon substituents containing from 1 to 6 carbon atoms, such as sulfomethyl, sulfatomethyl, sulfoethyl, sulfatoethyl, sulfopropyl, sulfatopropyl, sulfobutyl, sulfatobutyl, sulfophenyl, or sulfatophenyl substituents. Further, the benzo or naphtho nucleus completed by G, when substituted, can include one or a combination of substituents, such as alkyl, alkoxy, thioalkyl, and hydroxy substituents.

The preferred carbocyanine dyes are those capable of producing bathochromic absorption shifts. Thus aggregating dyes are preferred, particularly J aggregating carbocyanine dyes. Although J aggregation is known to be influenced by the specific molecular configuration of each individual dye, favorable aggregation is most commonly realized when $R^7$ is ethyl.

Preferred merocyanines dyes according to the invention can be represented by the following formula:

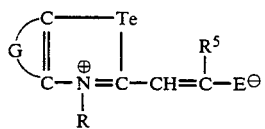

(XIV)

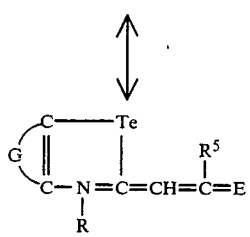

wherein

E represents an acidic keto methylene nucleus;

G represents a fused benzo or naphtho nucleus;

R represents a quaternizing substituent; and $R^5$ represents a dye property modifier.

From formula (XIV) it is apparent that, except for the acidic nucleus E, the portions constituting the preferred merocyanine dyes can be selected from among corresponding components constituting the cyanine dyes. Accordingly, these corresponding components of the merocyanine dyes are not redescribed.

The acidic nucleus E can take the form of any conventional merocyanine acid nucleus. Typically E is in one resonance extreme comprised of a methylene moiety bonded to a carbonyl, sulfo, or cyano group directly or through a methine linkage. Unlike the nuclei of the cyanine dyes, the acidic nucleus E need not be heterocyclic or even cyclic.

In a preferred form E can be represented by the formula

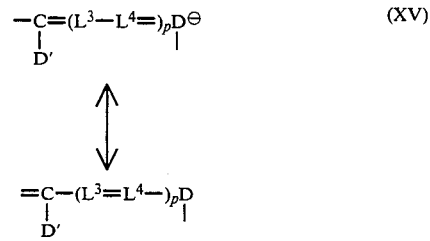

(XV)

wherein

D is a cyano, sulfo, or carbonyl group,

D' is a methine substituent, which in one form can with D complete a five or six membered heterocyclic ring containing ring atoms chosen from the class consisting of carbon, nitrogen, oxygen, and sulfur.

When E is an acyclic group—that is, when D and D' are independent groups, E can be chosen from among groups such as malononitrile, alkylsulfonylacetonitrile, cyanomethyl benzofuranyl ketone, or cyanomethyl phenyl ketone. In preferred cyclic forms of E, D, and D' together complete a 2-pyrazolin-5-one, pyrazolidene-3,5-dione, imidazoline-5-one, hydantoin, 2 or 4-thiohydantoin, 2-iminooxazoline-4-one, 2-oxazoline-5-one, 2-thiooxazolidine-2,4-dione, isoxazoline-5-one, 2-thiazoline-4-one, thiazolidine-4-one, thiazolidine-2,4-dione, rhodanine, thiazolidine-2,4-dithione, isorhodanine, indane-1,3-dione, thiophene-3-one, thiophene-3-1,1-dioxide, indoline-2-one, indoline-3-one, indazoline-3-one, 2-oxoindazolinium, 3-oxoindazolinium, 5,7-dioxo-6,7-dihydro-thiazolo[3,2-a]pyrimidine, cycylohexane-1,3-dione, 3,4-dihydroisoquinoline-4-one, 1,3-dioxane-4,6-dione, barbituric acid, 2-thiobarbituric acid, chroman-2,4-dione, indazoline-2-one, or pyrido[1,2- a]pyrimidine-1,3-dione nucleus. Conventional substituents of the rings are contemplated.

These are representative of specific preferred dyes according to this invention:

TABLE I

1. Anhydro 3,5,9-trimethyl-3'-(3-sulfopropyl)-tellurathiacarbocyanine hydroxide
2. Anhydro 5'-chloro-3,5,9-trimethyl-3'-(3-sulfopropyl)tellurathiacarbocyanine hydroxide
3. Anhydro 5'-methoxy-3,5,9-trimethyl-3'-(3-sulfopropyl)tellurathiacarbocyanine hydroxide
4. Anhydro 5',6'-dimethoxy-3,5,9-trimethyl-3'-(3-sulfopropyl)tellurathiacarbocyanine hydroxide
5. Anhydro 5-chloro-3',5',9-trimethyl-3-(3-sulfopropyl)selenatelluracarbocyanine hydroxide
6. Anhydro 3,9-diethyl-5-methyl-3'-(3-sulfopropyl)tellurathiacarbocyanine hydroxide
7. Anhydro 5'-chloro-3,9-diethyl-5-methyl-3'-(3-sulfopropyl)tellurathiacarbocyanine hydroxide
8. Anhydro 3,9-diethyl-5'-methoxy-5-methyl-3'-(3-sulfopropyl)tellurathiacarbocyanine hydroxide
9. Anhydro 3,9-diethyl-5',6'-dimethoxy-5-methyl-3'-(3-sulfopropyl)tellurathiacarbocyanine hydroxide
10. Anhydro 5-chloro-3',9-diethyl-5'-methyl-3-(3-sulfopropyl)selenatelluracarbocyanine hydroxide
11. Anhydro 3',9-diethyl-5'-methyl-1-(3-sulfopropyl)naphtho[1,2-d]thiatelluracarbocyanine hydroxide
12. Anhydro 3,9-diethyl-5'-methoxy-3'-(3-sulfopropyl)tellurathiacarbocyanine hydroxide
13. Anhydro 5'-chloro-3,9-diethyl-5-methoxy-3'-(3-sulfopropyl)tellurathiacarbocyanine hydroxide
14. Anhydro 3,9-diethyl-5,5'-dimethoxy-3'-(3-sulfopropyl)tellurathiacarbocyanine hydroxide
15. Anhydro 3,9-diethyl-5,5',6-trimethoxy-3'-(3-sulfopropyl)tellurathiacarbocyanine hydroxide
16. Anhydro 5-chloro-3'-9-diethyl-5'-methoxy-3-(3-sulfopropyl)selenatelluracarbocyanine hydroxide
17. Anhydro 3,9-diethyl-5,6-dimethyl-3'-(3-sulfopropyl)tellurathiacarbocyanine hydroxide
18. Anhydro 5'-chloro-3,9-diethyl-5,6-dimethyl-3'-(3-sulfopropyl)tellurathiacarbocyanine hydroxide
19. Anhydro 3,9-diethyl-5'-methoxy-5,6-dimethyl-3'-(3-sulfopropyl)tellurathiacarbocyanine hydroxide
20. Anhydro 3,9-diethyl-5',6'-dimethoxy-5,6-dimethyl-3'-(3-sulfopropyl)tellurathiacarbocyanine hydroxide
21. Anhydro 5-chloro-3',9-diethyl-5',6'-dimethyl-3'-(3-sulfopropyl)selenatelluracarbocyanine hydroxide
22. Anhydro 3'-(2-carboxy-2-sulfoethyl)-3,9-diethyl-5',6'-dimethoxy-5,6-dimethyltellurathiacarbocyanine hydroxide, potassium salt.
23. 3,3'-diethyl-5,5',9-trimethyltelluracarbocyanine chloride
24. 3,3',9-triethyl-5,5'-dimethyltelluracarbocyanine perchlorate
25. 5'-Chloro-3,3'-diethyl-5,9-dimethyltellurathiacarbocyanine chloride
26. 5'-Methoxy-3,3'-diethyl-5,9-dimethyltellurathiacarbocyanine chloride
27. 3,3'-Diethyl-5,9-dimethyltellurathiacarbocyanine perchlorate
28. Anhydro 5'-chloro-3,9-diethyl-5,6-dimethoxy-3'-(3-sulfopropyl)tellurathiacarbocyanine hydroxide
29. Anhydro 3,9-diethyl-5,5',6-trimethoxy-3'-(3-sulfopropyl)tellurathiacarbocyanine hydroxide
30. Anhydro 3,9-diethyl-5,5',6,6',-tetramethoxy-3'-(3-sulfopropyl)tellurathiacarbocyanine hydroxide
31. Anhydro 3,9-diethyl-5,6,-dimethoxy-3'-(3-sulfopropyl)tellurathiacarbocyanine hydroxide
32. Anhydro 3,9-diethyl-5,6,-dimethoxy-5'-phenyl-3'-(3-sulfopropyl)tellurathiacarbocyanine hydroxide
33. Anhydro 5'-chloro-9-ethyl-3-methyl-5,6-methylenedioxy-3'-(3-sulfopropyl)tellurathiacarbocyanine hydroxide TABLE I-continued 34. Anhydro 9-ethyl-5'-methoxy-3-methyl-5,6-methylenedioxy-3'-(3-sulfopropyl)tellurathiacarbocyanine hydroxide
35. Anhydro 9-ethyl-5',6'-dimethoxy-3-methyl-5,6-methylenedioxy-3'-(3-sulfopropyl)tellurathiacarbocyanine hydroxide
36. Anhydro 5-chloro-9-ethyl-3'-methyl-5',6'-methylenedioxy-3-(3-sulfopropyl)selenatelluracarbocyanine hydroxide
37. Anhydro 9-ethyl-3-methyl-5,6-methylenedioxy-3'-(3-sulfopropyl)tellurathiacarbocyanine hydroxide
38. Anhydro 5'-chloro-9-ethyl-3-methyl-5-methylthio-3'-(3-sulfopropyl)tellurathiacarbocyanine hydroxide
39. Anhydro 9-ethyl-5'-methoxy-3-methyl-5-methylthio-3'-(3-sulfopropyl)tellurathiacarbocyanine hydroxide
40. Anhydro 9-ethyl-5',6'-dimethoxy-3-methyl-5-methylthio-3'-(3-sulfopropyl)tellurathiacarbocyanine hydroxide
41. Anhydro 5-chloro-9-ethyl-3'-methyl-5'-methylthio-3-(3-sulfopropyl)selenatelluracarbocyanine hydroxide
42. Anhydro 9-ethyl-3-methyl-5-methylthio-3'-(3-sulfopropyl)tellurathiacarbocyanine hydroxide
43. 1,3-Diethyl-5-[1-methyl-2-(3,5-dimethylbenzotellurazolin-2-ylidene)ethylidene]barbituric Acid
44. 1,3-Diethyl-5-[1-methyl-2-(3,5-dimethylbenzotellurazolin-2-ylidene)ethylidene]-2-thiobarbituric acid
45. 3-Methyl-4-[2-(3-ethyl-5,6-dimethylbenzotellurazolin-2-ylidene)-1-methylethylidene]-1-phenyl-2-pyrazolin-5-one
46. 3-Ethyl-5-[2-(3-ethyl-5-methoxybenzotellurazolin-2-ylidene)-1-methylethylidene]rhodanine
47. 1,3-Diethyl-5-[1-ethyl-2-(3-ethyl-5,6-dimethoxybenzotellurazolin-2-ylidene)ethylidene]-2-thiobarbituric acid
48. 1,3-Diethyl-5-{[(3-ethylbenzothiazolin-2-ylidene)methyl][(3,5-dimethyl-benzotellurazolin-2-ylidene)methyl]methylene} barbituric acid
49. 3-Ethyl-5-{[(3-ethylbenzothiazolin-2-ylidene)methyl][(1,5-dimethyl-naphtho[1,2-d]tellurazolin-2-ylidene)methyl]methylene}rhodanine
50. 1,3-Diethyl-5-{bis[(3-ethyl-5,6-dimethylbenzotellurazolin-2-ylidene)methyl]methylene}barbituric acid
51. 3-Ethyl-5-{[(3-ethyl-5-methylbenzotellurazolin-2-ylidene)methyl][1-ethylnaphtho[1,2-d]-tellurazolin-2-ylidene)methyl]methylene} -rhodanine
52. Anhydro 5'-chloro-3-ethyl-5,9-dimethyl-3'-(3-sulfopropyl)tellurathiacarbocyanine hydroxide The dyes according to this invention can be applied to any application where otherwise corresponding dyes containing another chalcogen atom are employed. This invention is specifically directed to applying the β position substituted tellurazolium polymethine dyes to photographic uses, particularly uses in silver halide photography.

In its most widely employed form silver halide photography employs for imaging radiation sensitive silver halide grains. The grains are suspended in a dispersing medium, typically including a hydrophilic colloid, such as gelatin, so that the grains and dispersing medium together form a radiation sensitive silver halide emulsion. The silver halide emulsions are typically coated on a photographic film or paper support to form a photographic element. A simple photographic element can consist of a support and an emulsion layer; however, typically additional hydrophilic colloid layers, such as multiple emulsion layers, subbing layers, interlayers, and overcoats are also present. The silver halide emulsions can be usefully, though incompletely, categorized as those which form predominantly surface or predominantly internal latent images upon exposure. Photographic elements can be conveniently classified as being direct positive photographic elements or negative working photographic elements. Whether a positive or negative viewable image is produced is a function of both the emulsion chosen and the photographic processing undertaken. Although light processing is known and employed for specialized applications, in most instances photographic processing to produce a viewable image is accomplished by development of an imagewise exposed photographic element in an aqueous alkaline processing solution. Usually internal latent image forming emulsions are employed in combination with uniform light exposure or, preferably a nucleating agent, to produce direct positive images. Direct positive images can be produced also by employing initially surface fogged silver halide grains which rely on selective development of unexposed grains to produce direct positive images. Internal latent image emulsions can be used to produce negative images by internal development—that is, developing in the presence of iodide ion or a silver halide solvent capable of rendering the internal latent image site accessible to the developing agent. Aside from solarization effects, surface latent image emulsions cannot produce direct positive images, but are extensively used to produce positive color images by reversal processing. Of extreme importance to obtaining commercially attractive photographic images are a large variety of emulsion, photographic element, and processing solution addenda. A succinct summary of radiation sensitive silver halide emulsions, photographic elements, processing solutions, their basic and modifying components, and significant patents and publications describing their features is contained in *Research Disclosure,* Vol. 176, December 1978, Item 17643. *Research Disclosure* is published by Kenneth Mason Publications, Ltd., 8 North Street, Emsworth, Hampshire P010 7DD, England.

The dyes of this invention are in a preferred application incorporated into one or more hydrophilic colloid layers of silver halide photographic elements. The location and concentration the dye is dictated by the photographically useful function sought to be realized. The dyes can be located behind one or more silver halide emulsion layers as imagewise exposed to absorb actinic radiation penetrating the silver halide emulsion layer or layers, thereby reducing scattered radiation. In other words, the dyes can be employed as antihalation dyes. They can be incorporated in interlayers or in overcoats to function as filter dyes. In a preferred application they can be incorporated directly in the silver halide emulsion. The dyes can increase photographic sharpness by intercepting and absorbing actinic radiation that would otherwise be reflected between grains. In other words, the dyes can take the form of intergrain absorbers. When absorbed to silver halide grain surfaces, the dyes can act as spectral sensitizers in the the photographic elements.

The invention can be better appreciated by reference to the following specific examples:

EXAMPLE 1

Dyes listed in Table I were synthesized and observed to exhibit the physical properties set forth in Table II below. Wavelengths (e.g., $\lambda$-max values) are expressed in nanometers in each occurrence. Extinction coefficients (i.e., $\epsilon$-max values) are expressed in units of liters/mole-cm in each occurrence throughout the examples. N.R. stands for not reported.

TABLE II

| Dye No. | Empirical Formula | MW | $\lambda$-max (mn) | $\epsilon$-max | Solvent |
|---|---|---|---|---|---|
| 1. | $C_{23}H_{24}N_2O_3S_2Te$ | 568 | 568 | $9.1 \times 10^4$ | 10% Cresol-90% MeOH |
| 2. | $C_{23}H_{23}ClN_2O_3S_2Te$ | 603 | 573 | $8.77 \times 10^4$ | 10% Cresol-90% MeOH |
| 3. | $C_{24}H_{26}N_2O_4S_2Te$ | 598 | 575 | $8.44 \times 10^4$ | 10% Cresol-90% MeOH |
| 4. | $C_{25}H_{28}N_2O_5S_2Te$ | 628 | 580 | $8.33 \times 10^4$ | 10% Cresol-90% MeOH |
| 5. | $C_{23}H_{23}ClN_2O_3SSeTe$ | 650 | 578 | $6.7 \times 10^4$ | 10% Cresol-90% MeOH |
| 6. | $C_{25}H_{28}N_2O_3S_2Te$ | 596 | 575 | $7.9 \times 10^4$ | 10% Cresol-90% MeOH |
| 7. | $C_{25}H_{27}Cl_2O_3S_2Te$ | 631 | 578 | $7.7 \times 10^4$ | 10% Cresol-90% MeOH |
| 8. | $C_{26}H_{20}N_2O_4S_2Te$ | 626 | 580 | $8.1 \times 10^4$ | 10% Cresol-90% MeOH |
| 9. | $C_{27}H_{32}N_2O_5S_2Te$ | 656 | 588 | $7.8 \times 10^4$ | 10% Cresol-90% MeOH |
| 10. | $C_{25}H_{27}ClN_2O_3SSeTe$ | 678 | 584 | $5.6 \times 10^4$ | 10% Cresol-90% MeOH |
| 11. | $C_{29}H_{30}N_2O_3S_2Te$ | 646 | 591 | $7.8 \times 10^4$ | 10% Cresol-90% MeOH |
| 12. | $C_{25}H_{28}N_2O_4S_2Te$ | 612 | 578 | $7.6 \times 10^4$ | 10% Cresol-90% MeOH |
| 13. | $C_{25}H_{27}N_2ClO_4S_2Te$ | 646 | 583 | $8.4 \times 10^4$ | 10% Cresol-90% MeOH |
| 14. | $C_{26}H_{30}N_2O_5S_2Te$ | 642 | 584 | $7.9 \times 10^4$ | 10% Cresol-90% MeOH |
| 15. | $C_{27}H_{32}N_2O_6S_2Te$ | 671 | 589 | $7.3 \times 10^4$ | 10% Cresol-90% MeOH |
| 16. | $C_{25}H_{27}N_2ClO_4SSeTe$ | 694 | 589 | $6.9 \times 10^4$ | 10% Cresol-90% MeOH |
| 17. | $C_{25}H_{30}N_2O_3S_2Te$ | 610 | 576 | $6.8 \times 10^4$ | 10% Cresol-90% MeOH |
| 18. | $C_{26}H_{29}ClN_2O_3S_2Te$ | 644 | 579 | $6.8 \times 10^4$ | 10% Cresol-90% MeOH |
| 19. | $C_{27}H_{32}N_2O_4S_2Te$ | 640 | 584 | $7.0 \times 10^4$ | 10% Cresol-90% MeOH |
| 20. | $C_{28}H_{34}N_2O_5S_2Te$ | 670 | 591 | $7.2 \times 10^4$ | 10% Cresol-90% MeOH |
| 21. | $C_{26}H_{29}ClN_2O_3SSeTe$ | 692 | 583 | $5.1 \times 10^4$ | 10% Cresol-90% MeOH |
| 22. | $C_{28}H_{31}KN_2O_7S_2Te$ | 738 | 594 | N.R. | 10% Cresol-90% NeOH |
| 23. | $C_{24}H_{27}ClN_2Te_2$ | 634 | 586 | $7.0 \times 10^4$ | MeOH |
| 24. | $C_{25}H_{29}ClN_2O_4Te_2$ | 712 | N.R. | N.R. | N.R. |
| 25. | $C_{23}H_{24}Cl_2N_2STe$ | 559 | 565 | $10.2 \times 10^4$ | MeOH |
| 26. | $C_{24}H_{26}ClN_2OSTe$ | 555 | 569 | $10.2 \times 10^4$ | MeOH |
| 27. | $C_{23}H_{25}ClN_2O_4STe$ | 589 | 563 | $10.1 \times 10^4$ | MeOH |
| 28. | $C_{26}H_{29}ClN_2O_5S_2Te$ | 677 | 590 | $6.4 \times 10^4$ | 10% Cresol-90% MeOH |
| 29. | $C_{27}H_{32}N_2O_6S_2Te$ | 672 | 594 | $7.0 \times 10^4$ | 10% Cresol-90% MeOH |
| 30. | $C_{28}H_{34}N_2O_7S_2Te$ | 702 | 602 | $7.6 \times 10^4$ | 10% Cresol-90% MeOH |
| 31. | $C_{26}H_{30}N_2O_5S_2Te$ | 642 | 587 | $6.2 \times 10^4$ | 10% Cresol-90% MeOH |
| 32. | $C_{32}H_{34}N_2O_5S_2Te$ | 718 | 593 | $7.0 \times 10^4$ | 10% Cresol-90% MeOH |
| 33. | $C_{24}H_{23}ClN_2O_5S_2Te$ | 647 | 586 | $5.9 \times 10^4$ | 10% Cresol-90% MeOH |
| 34. | $C_{35}H_{26}N_2O_6S_2Te$ | 642 | 591 | $6.8 \times 10^4$ | 10% Cresol-90% MeOH |
| 35. | $C_{26}H_{28}N_2O_7S_2Te$ | 672 | 598 | $6.8 \times 10^4$ | 10% Cresol-90% MeOH |

TABLE II-continued

| Dye No. | Empirical Formula | Physical Constants | | | |
|---|---|---|---|---|---|
| | | MW | λ-max (mn) | ε-max | Solvent |
| 36. | $C_{24}H_{23}ClN_2O_5SSeTe$ | 694 | 590 | $4.8 \times 10^4$ | 10% Cresol-90% MeOH |
| 37. | $C_{24}H_{24}N_2O_5S_2Te$ | 612 | 585 | $6.4 \times 10^4$ | 10% Cresol-90% MeOH |
| 38. | $C_{24}H_{25}ClN_2O_3S_3Te$ | 649 | 582 | $7.2 \times 10^4$ | 10% Cresol-90% MeOH |
| 39. | $C_{25}H_{28}N_2O_4S_3Te$ | 644 | 583 | $7.6 \times 10^4$ | 10% Cresol-90% MeOH |
| 40. | $C_{26}H_{30}N_2O_5S_8Te$ | 674 | 589 | $7.1 \times 10^4$ | 10% Cresol-90% MeOH |
| 41. | $C_{24}H_{25}ClN_2O_3S_2SeTe$ | 696 | 588 | $6.0 \times 10^4$ | 10% Cresol-90% MeOH |
| 42. | $C_{24}H_{26}N_2O_3S_3Te$ | 614 | 578 | $7.1 \times 10^4$ | 10% Cresol-90% MeOH |
| 43. | $C_{20}H_{23}N_3O_3Te$ | 481 | 500 | $4.1 \times 10^4$ | Pyridine |
| 48. | $C_{30}H_{32}N_4O_3STe$ | 656 | 592 | $15.8 \times 10^4$ | 10% Cresol-90% MeOH |

The dyes were each tested in a 0.1 μm sulfur and gold sensitized, monodispersed gelatinosilver bromoiodide emulsion containing 2.5 mole percent iodide. The dyes were added to separate portions of the emulsions at the concentrations indicated and the resulting mixtures were coated to obtain silver coverage of 1.07 g/m² on a cellulose ester support. An example of each coating was exposed in a spectral sensitometer to a quartz-halogen light source through a Wratten 80B color correcting filter, diffraction grating with filters to remove second order transmission, and superimposed step wedge. The coatings were developed in a Kodak X-Omat ® processor for 80 seconds at 23° C. in an Elon ® (p-N-methylaminophenol hemisulfate)-hydroquinone developer, fixed, washed, and dried.

A Density vs Log Exposure curve (D log E) was determined for each coating at 400 nm and at each 10 nm interval between 400 nm and 700 nm. The speed at 0.3 density units above fog was read from each D log E curve, adjusted for a uniform energy distribution over the spectral range, and plotted against wavelength to obtain a relative log spectral sensitivity curve. The sensitizing maximum and the relative speed at the sensitizing maximum for each dye was determined from this curve. The results are summarized in Table III.

TABLE III

| Dye | Level | Sens max (nm) | Sens Range (nm) | Rel 400 nm Sens |
|---|---|---|---|---|
| Undyed | — | — | to 510 | 100 |
| 1 | 8.0 | 540 | 490–690 | 110 |
| | | 630 | N.R. | N.R. |
| 2 | — | — | N.R. | N.R. |
| 3 | 8.0 | 530 | 490–680 | 110 |
| 4 | 8.0 | 590 | 500–710 | 135 |
| 5 | 8.0 | 530 | 510–600 | 85 |
| 6 | — | — | N.R. | N.R. |
| 7 | 8.0 | 670 | 500–730 | 129 |
| 8 | 6.0 | 680 | 490–750 | 151 |
| 9 | 8.0 | 690 | 490–760 | 170 |
| 10 | 8.0 | 680 | 510–720 | 71 |
| 11 | 8.0 | 690 | 500–740 | 118 |
| 12 | 8.0 | 680 | 490–730 | 129 |
| 13 | 8.0 | 680 640 | 490–730 | 229 |
| 14 | 8.0 | 680 640(S) | 490–730 | 112 |
| 15 | 6.0 | 620 690 | 490–740 | 107 |
| 16 | 8.0 | 690 | 490–730 | 107 |
| 17 | 8.0 | 690 670 | 490–730 | 209 |
| 18 | 8.0 | 680 | 490–730 | 141 |
| 19 | 8.0 | 680 | 490–740 | 186 |
| 20 | 8.0 | 690 | 490–740 | 162 |
| 21 | 8.0 | 690 | 490–740 | 162 |
| 22 | 6.0 | 690 | 490–740 | 115 |
| 28 | 8.0 | 650 | 540–680 | 195 |
| 29 | 8.0 | 700 630(S) | 490–750 | 204 |
| 30 | 6.0 | 660 550 | 480–750 | 182 |
| 31 | 8.0 | 630 | 510–690 | 214 |
| 32 | 6.0 | 680 | 490–750 | 209 |
| 48 | 8.0 | 510 610 | 440–540, 590–620 | 145 |

The following are representative preparations of β position substituted tellurazolium polymethine dyes:

EXAMPLE A

Preparation of:
2-(2-Chloro-1-buten-1-yl)-3-ethyl-5-methylbenzotellurazolium Tetrafluoroborate $C_{14}H_{17}BClF_4NTe$ MW=449

The compound of Example B (1.03 g, 0.003 moles) and phosphoryl chloride (2 ml) were heated together until boiling just started. The yellow solution was cooled to room temperature. Crystallization was induced and eventually a solid mass formed. Ethyl ether (25 ml) was added. After stirring the solid was collected by filtration, washed with ethyl ether and dissolved in warm ethanol (25 ml). A fifty percent aqueous solution of tetrafluoroboric acid (0.79 g, 0.0045 moles) was added. After chilling the solid was filtered off, washed with a small amount of cold ethanol and then with ethyl ether. It was dried at 40° C. over vacuum. Yield 0.70 g. An additional 0.25 g was obtained by concentrating the filtrate about 5 ml and slowly diluting with ice water to about 20 ml. The collected precipitate was washed with water and dried as before. Total yield 0.95 g (70 percent).

EXAMLE B

Preparation of:
3-Ethyl-5-methyl-2-propanoylmethylenebenzotellurazoline $C_{14}H_{17}NOTe$ MW=343

The compound of Example C (1.0 g, 0.00217 moles), powdered, was placed in a round-bottomed flask. Concentrated hydrochloric acid (6 ml) was added and the mixture was heated rapidly to boiling with swirling. The solid dissolved and new solid soon separated. The reaction mixture was maintained at refluxing temperature for about two minutes then cooled. It was diluted to about 50 ml with ice water and the mixture then was extracted with ethyl ether (about 30 ml). The ether was evaporated from the extracts and the resulting oil was dissolved in methanol. Precipitation was induced and water was then added slowly. The solid was filtered off, washed with water and dried at 40° C. under vacuum. Yield 0.50 g (67 percent).

EXAMPLE C

Preparation of:
2-(2-Ethoxy-1-buten-1-yl)-3-ethyl-5-methylbenzotellurazolium Tetrafluoroborate $C_{16}H_{22}BF_4NOTe$ MW=459

3-Ethyl-2,5-dimethylbenzotellurazolium tetrafluoroborate (31.6 g, 0.069 moles) was dissolved in cresol (65 g). 1,1,1-Triethoxy propane (45 g, 3 equivalents) was added and the mixture was heated with stirring at 140° C. in an oil bath until ethanol began to boil off. Heating was continued for another five minutes and the reaction mixture then cooled. Ethanol (150 ml) was added and the solution then slowly diluted with ether to 1.5 liters. The product was filtered off, washed with ether and dried on the filter pad. Yield 31 g. It was recrystallized from ethanol 800 ml). Yield 22.7 g (55 percent).

EXAMPLE D

Preparation of: Dye 7 of Table I

The intermediate of Example A (0.90 g, 0.002 moles), anhydro-5-chloro-2-methyl-3-(3-sulfopropyl)benzothiazolium hydroxide (0.61 g, 0.002 moles) and 80 percent acetonitrile (aqueous) (12.5 ml) were stirred together until an almost clear solution was obtained. Triethylamine (0.44 g, 0.0044 moles) in acetonitrile (1 ml) was added dropwise with stirring. The reaction mixture was diluted to 30 ml with acetonitrile and stirred for 15 minutes. The dye which separated was filtered off, washed with acetonitrile, methanol and ethyl ether in succession and dried at 40° under vacuum. Yield 0.85 g (67 percent).

A 0.78 g sample of the product was recrystallized by dissolving it in m-cresol (5 ml) and then adding methanol (100 ml). Crystallization was induced and the mixture was chilled overnight. Yield 0.70 g (60 percent).

Dyes 6, 8, 9, 10 and 11 were prepared in the same way as Dye 7 except an appropriate quaternary salt or betaine was used in place of 2-methyl-3-(3-sulfopropyl)benzothiazolium hydroxide.

EXAMPLE E

Preparation of: Dye 2 of Table I 2-(2-Chloro-1-propen-1-yl)-3,5-dimethylbenzotellurazolium tetrafluoroborate (0.84 g, 0.002 moles), anyhydro 5-chloro-2-methyl-3-(3-sulfopropyl)benzothiazolium hydroxide (0.61 g, 0.002 moles) and 80 percent acetonitrile (aqueous) (12.5 ml) were combined, as in Example D, and triethylamine (0.44 g, 0.0044 moles) was added dropwise with stirring. The reaction was carried out and the product isolated as in Example D. Yield 0.66 g (55 percent). It was recrystallized from 5 ml cresol/1000 ml methanol.

EXAMPLE F

Preparation of: Dye 43 in Table I 2,(2-Chloro-1-propen-1-yl)-3,5-dimethylbenzotellurazolium tetrafluoroborate (1.7 g., 0.004 moles) and 1,3-diethylbarbituric acid (0.74 g., 0.004 moles) were dissolved in a 1:1 mixture of acetonitrile and methanol. Triethylamine in methanol was added slowly. Stirring was continued at room temperature for fifteen minutes. The solid was isolated by filtration and air dried. The yield was 0.90 g. (47%). A 0.30 g. sample was recrystallized from hot methanol (50 ml).

EXAMPLE G

Preparation of: Dye 48 in Table I

Dye 43 (0.60 g., 0.00125 mole) and 3-ethyl-2-phenlythiobenzothiazolium iodide (0.50 g., 0.00125 mole) were dissolved in demithylformamide (DMF) (20 ml) at about 100° C. Triethylamine in DMF (2 ml) was added. The resulting purple solution was poured into water (250 ml) and crystallization was induced. The crystalline product was isolated by filtration and dried. The yield was 0.63 g. The dye was recrystallized from hot methanol (30 ml).

The invention has been described in detail with particular reference to preferred embodiments thereof, but it will be understood that variations and modifications can be effected within the spirit and scope of the invention.

What is claimed is:

1. A photographic element comprised of
   a support,
   at least one radiation sensitive silver halide emulsion layer located on said support, and
   a polymethine dye located to facilitate photographic image formation containing as a nucleus thereof an aromatic ring and, fused with said aromatic ring, an azolium ring containing a divalent tellurium atom in its 1-position and substituted at its 2-position with a methine chain, the carbon atom of the methine chain which is in the $\beta$ position with respect to the azolium ring being substituted with a dye property modifier.

2. A photographic element according to claim 1 wherein said polymethine dye is located between said silver halide emulsion layer and said support.

3. A photographic element according to claim 1 wherein said polymethine dye is located between said silver halide emulsion layer and exposing radiation.

4. A photographic element according to claim 1 wherein said polymethine dye is located within said silver halide emulsion layer.

5. A photographic element according to claim 4 wherein said silver halide emulsion layer is comprised of radiation sensitive silver halide grains and a dispersing medium.

6. A photographic element according to claim 5 wherein said polymethine dye is located within said dispersing medium.

7. A photographic element according to claim 5 wherein said polymethine dye is adsorbed to said radiation sensitive silver halide grains.

8. A photographic element according to claim 7 wherein said polymethine dye is adsorbed to said radiation sensitive silver halide grains in an amount sufficient to alter their sensitivity.

9. A photographic element according to claim 8 wherein said polymethine dye is a sensitizing dye capable of extending the sensitivity of said silver halide grains to longer wavelengths of electromagnetic radiation.

10. A photographic element according to claim 9 wherein said polymethine dye is capable of sensitizing in at least one of the red and infrared portions of the spectrum.

11. A photographic element according to claim 5 wherein said radiation sensitive silver halide grains form a predominantly surface latent image.

12. A photographic element according to claim 5 wherein said radiation sensitive silver halide grains form a predominantly internal latent image.

13. A photographic element according to claim 1 wherein said polymethine dye is a cyanine dye.

14. A photograhic element comprised of
a support,
at least one emulsion layer comprised of radiation sensitive silver halide grains and a dispersing medium, located on said support, and
adsorbed to said silver halide grains a cyanine spectral sensitizing dye containing as a basic nucleus thereof an aromatic ring and, fused with said aromatic ring, an azolium ring containing a divalent tellurium atom in its 1-position and substituted at its 2-position with a methine chain, the carbon atom of the methine chain which is in the $\beta$ position with respect to the azolium ring being substituted with a dye property modifier.

15. A photographic element according to claim 14 wherein said cyanine dye is adsorbed to said silver halide grains in an aggregated state contributing bathochromically to shifting adsorption of said cyanine dye.

16. A photographic element according to claim 15 wherein said cyanine dye is a carbocyanine dye.

17. A photographic element according to claim 1 wherein said polymethine dye is a merocyanine dye.

18. A process of producing a viewable photographic image comprising photographically processing an imagewise exposed photographic element according to claim 1.

19. A photographic element according to claim 1 in which said azolium ring of said polymethine dye is a tellurazolium ring.

20. A photographic element according to claim 19 wherein said tellurazolium ring represents one resonance extreme.

21. A photographic element according to claim 19 in which said aromatic ring is a carbocyclic aromatic ring.

22. A photographic element according to claim 21 in which said carbocyclic aromatic ring is a benzo or naphtho ring.

23. A photographic element according to claim 22 in which said benzo or naphtho ring includes at least one substituent chosen from among aliphatic or aromatic hydrocarbon moieties optionally linked through a divalent oxygen or sulfur atom, amino groups, amido groups, sulfonamido groups, sulfamoyl groups, ureido groups, thioureido groups, hydroxy groups, —C(O)M groups, and —S(O)₂M groups, wherein M is chosen to complete an acid, ester, thioester, or salt.

24. A photographic element according to claim 19 in which said dye property modifier is an alkyl substituent.

25. A photographic element according to claim 19 in which said dye property modifier is an aromatic substituent.

26. A photographic element according to claim 19 in which said polymethine dye is a cyanine, merocyanine, or allopolar cyanine or merocyanine dye.

27. A photographic element according to claim 14 in which said cyanine dye is of the formula

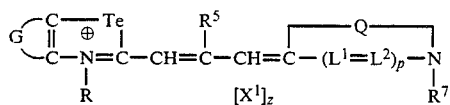

wherein
G represents a fused benzo or naphtho nucleus;
R and R⁷ independently represent quaternizing substituents;
R⁵ represents a dye property modifier;
Q represents the atoms completing a basic azole or azine nucleus;
X¹ represents a counterion; and
z is zero or a positive integer chosen to balance ionic charge.

28. A photographic element according to claim 27 wherein R⁵ is an alkyl group of from 1 to 6 carbon atoms.

29. A photographic element according to claim 28 wherein said alkyl group is a methyl group.

30. A photographic element according to claim 28 wherein said alkyl group is an ethyl group.

31. A photographic element according to claim 27 wherein said benzo or naphtho nucleus includes an electron donating substituent.

32. A photographic element according to claim 28 wherein at least one of R and R⁷ is comprised an optionally substituted hydrocarbon group.

33. A photographic element according to claim 32 wherein at least one of R and R⁷ is comprised of a solubilizing substituent of said hydrocarbon group.

34. A photographic element according to claim 32 wherein said hydrocarbon group is comprised of from 1 to 6 carbon atoms.

35. A photographic element according to claim 27 wherein Q is chosen from among benzotellurazolinylidene, naphthotellurazolinylidene, 2- or 4-pyridylidene, imidazopyridylidene, 2- or 4-quinolinylidene, 1- or 3-isoquinolinylidene, benzoquinolinylidene, thiazoloquinolylidene, imidazoquinolylidene, 3H-indolylidene, 1H or 3H-benzindolylidene, oxazolinylidene, oxazolidinylidene, benzoxazolinylidene, naphthoxazolinylidene, oxadiazolinylidene, thiazolidinylidene, phenanthrothiazolinylidene, acenaphthothiazolinylidene, thiazolinylidene, benzothiazolinylidene, naphthothiazolinylidene, tetrahydrobenzothiazolinylidene, dihydronaphthothiazolinylidene, thiadioxazolinylidene, selenazolinylidene, selenazolidinylidene, benzoselenazolinylidene, naphthoselenazolinylidene, selenadiazolinylidene, pyrazolylidene, imidazolinylidene, imidazolidinylidene, benzimidazolylidene, naphthimidazolinylidene, diazolinylidene, tetrazolinylidene, and imidazoquinoxalinylidene nuclei.

36. A photographic element according to claim 35 chosen from the group consisting of anhydro 3,5,9-trimethyl-3'-(3-sulfopropyl)tellurathiacarbocyanine hydroxide, anhydro 5'-chloro-3,5,9-trimethyl-3'-(3-sulfopropyl)tellurathiacarbocyanine hydroxide, anhydro 5'-methoxy-3,5,9-trimethyl-3'-(3-sulfopropyl)tellurathiacarbocyanine hydroxide, anhydro 5',6'-dimethoxy-3,5,9-trimethyl-3'-(3-sulfopropyl)tellurathiacarbocyanine hydroxide, anhydro 5-chloro-3',5',9-trimethyl-3-(3-sulfopropyl)selenatelluracarbocyanine hydroxide, anhydro 3,9-diethyl-5-methyl-3'-(3-sulfopropyl)tellurathiacarbocyanine hydroxide, anhydro 5'-chloro-3,9-diethyl-5-methyl-3'-(3-sulfopropyl)tellurathiacarbocyanine hydroxide, anhydro 3,9-diethyl-5'-methoxy-5-methyl-3'-(3-sulfopropyl)-tellurathiacarbocyanine hydroxide, anhydro 3,9-diethyl-5',6'-dimethoxy-5-methyl-3'-(3-sulfopropyl)tellurathiacarbocyanine hydroxide, anhydro 5-chloro-3',9-diethyl-5'-methyl-3-(3-sulfopropyl)selenatelluracarbocyanine hydroxide, anhydro 3′,9-diethyl-5′-methyl-1-(3-sulfopropyl)naphtho[1,2-d]thiatelluracarbocyanine hydroxide, anhydro 3,9-diethyl-5′-methoxy-3′-(3-sulfopropyl)tellurathiacarbocyanine hydroxide, anhydro 5′-chloro-3,9-diethyl-5-methoxy-3′-(3-sulfopropyl)tellurathiacarbocyanine hydroxide, anhydro 3,9-diethyl-5,5′-dimethoxy-3′-(3-sulfopropyl)tellurathiacarbocyanine hydroxide, anhydro 3,9-diethyl-5,5′,6-trimethoxy-3′-(3-sulfopropyl)tellurathiacarbocyanine hydroxide, anhydro 5-chloro-3′-9-diethyl-5′-methoxy-3-(3-sulfopropyl)selenatelluracarbocyanine hydroxide, anhydro 3,9-diethyl-5,6-dimethyl-3′-(3-sulfopropyl)tellurathiacarbocyanine hydroxide, anhydro 5′-chloro-3,9-diethyl-5,6-dimethyl-3′-(3-sulfopropyl)tellurathiacarbocyanine hydroxide, anhydro 3,9-diethyl-5′-methoxy-5,6-dimethyl-3′-(3-sulfopropyl)-tellurathiacarbocyanine hydroxide, anhydro 3,9-diethyl-5′,6′-dimethoxy-5,6-dimethyl-3′-(3-sulfopropyl)tellurathiacarbocyanine hydroxide, anhydro 5-chloro-3′,9-diethyl-5′,6′-dimethyl-3′-(3-sulfopropyl)selenatelluracarbocyanine hydroxide, anhydro 3′-(2-carboxy-2-sulfoethyl)-3,9-diethyl-5′,6′-dimethoxy-5,6-dimethyltellurathiacarbocyanine hydroxide, potassium salt, 3,3′-diethyl-5,5′,9-trimethyltelluracarbocyanine chloride, 3,3′,9-triethyl-5,5′-dimethyltelluracarbocyanine perchlorate, 5′-chloro-3,3′-diethyl-5,9-dimethyltellurathiacarbocyanine chloride, 5′-methoxy-3,3′-diethyl-5,9-dimethyltellurathiacarbocyanine chloride, 3,3′-diethyl-5,9-dimethyltellurathiacarbocyanine perchlorate, anhydro 5′-chloro-3,9-diethyl-5,6-dimethoxy-3′-(3-sulfopropyl)tellurathiacarbocyanine hydroxide, anhydro 3,9-diethyl-5,5′,6-trimethoxy-3′-(3-sulfopropyl)tellurathiacarbocyanine hydroxide, anhydro 3,9-diethyl-5,5′,6,6′,-tetramethoxy-3′-(3-sulfopropyl)tellurathiacarbocyanine hydroxide, anhydro 3,9-diethyl-5,6,-dimethoxy-3′-(3-sulfopropyl)tellurathiacarbocyanine hydroxide, anhydro 3,9-diethyl-5,6,-dimethoxy-5′-phenyl-3′-(3-sulfopropyl)tellurathiacarbocyanine hydroxide, anhydro 5′-chloro-9-ethyl-3-methyl-5,6-methylenedioxy-3′-(3-sulfopropyl)tellurathiacarbocyanine hydroxide, anhydro 9-ethyl-5′-methoxy-3-methyl-5,6-methylenedioxy-3′-(3-sulfopropyl)tellurathiacarbocyanine hydroxide, anhydro 9-ethyl-5′,6′-dimethoxy-3-methyl-5,6-methylenedixoy-3′-(3-sulfopropyl)tellurathiacarbocyanine hydroxide, anhydro 5′-chloro-9-ethyl-3′-methyl-5,6-methylenedioxy-3-(3-sulfopropyl)-selenatelluracarbocyanine hydroxide, anhydro 9-ethyl-3-methyl-5,6-methylenedioxy-3′-(3-sulfopropyl)tellurathiacarbocyanine hydroxide, anhydro 5′-chloro-9-ethyl-3-methyl-5-methylthio-3′-(3-sulfopropyl)tellurathiacarbocyanine hydroxide, anhydro 9-ethyl-5′-methoxy-3-methyl-5-methylthio-3′-(3-sulfopropyl)tellurathiacarbocyanine hydroxide, anhydro 9-ethyl-5′,6′-dimethoxy-3-methyl-5-methylthio-3′-(3-sulfopropyl)tellurathiacarbocyanine hydroxide, anhydro 5-chloro-9-ethyl-3′-methyl-5′-methylthio-3-(3-sulfopropyl)-selenatelluracarbocyanine hydroxide, anhydro 9-ethyl-3-methyl-5-methylthio-3′-(3-sulfopropyl)tellurathiacarbocyanine hydroxide, 1,3-diethyl-5-[1-methyl-2-(3,5-dimethylbenzotellurazolin-2-ylidene)ethylidene]barbituric acid, 1,3-diethyl-5-[1-methyl-2-(3,5-dimethylbenzotellurazolin-2-ylidene)ethylidene]-2-thiobarbituric acid, 3-methyl-4-[2-(3-ethyl-5,6-dimethylbenzotellurazolin-2-ylidene)-1-methylethylidene]-1-phenyl-2-pyrazolin-5-one, 3-ethyl-5-[2-(3-ethyl-5-methoxybenzotellurazolin-2-ylidene)-1-methylethylidene]-rhodanine, 1,3-diethyl-5-[1-ethyl-2-(3-ethyl-5,6-dimethoxybenzotellurazolin-2-ylidene)ethylidene]-2-thiobarbituric acid, 1,3-diethyl-5-{[(3-ethylbenzothiazolin-2-ylidene)methyl]-[(3,5-dimethyl-benzotellurazolin-2-ylidene)methyl]methylene}barbituric acid, 3-ethyl-5-{[(3-ethylbenzothiazolin-2-ylidene)-methyl][(1,5-dimethyl-naphtho[1,2-d]-tellurazolin-2-ylidene)methyl]methylene}rhodanine, 1,3-diethyl-5-{bis[(3-ethyl-5,6-dimethylbenzotellurazolin-2-ylidene)-methyl]methylene}barbituric acid, 3-ethyl-5-{[(3-ethyl-5-methylbenzotellurazolin-2-ylidene)methyl]-[(1-ethyl-naphtho[1,2-d]-tellur-azolin-2-ylidene)methyl]methylene}-rhodanine, and anhydro 5′-chloro-3-ethyl-5,9-dimethyl-3′-(3-sulfo-propyl)tellurathiacarboxyanine hydroxide.

37. A photographic element according to claim 17 in which said merocyanine dye is of the formula

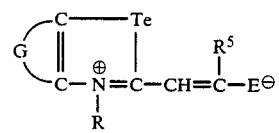

wherein

E represents an acidic keto methylene nucleus;
G represents a fused benzo or naphtho nucleus;
R represents a quaternizing substituent; and
$R^5$ represents a dye property modifier.

38. A photograhic element according to claim 37 wherein $R^5$ is an alkyl group of from 1 to 6 carbon atoms.

39. A photographic element according to claim 28 wherein said alkyl group is a methyl or ethyl group.

40. A photographic element according to claim 37 wherein said benzo or naphtho nucleus includes an electron donating substituent.

41. A photographic element according to claim 37 wherein R is comprised an optionally substituted hydrocarbon group.

42. A photographic element according to claim 41 wherein R is additionally comprised of a solubilizing substituent of said hydrocarbon group.

43. A photographic element according to claim 41 wherein said hydrocarbon group is comprised of from 1 to 6 carbon atoms.

44. A photographic element according to claim 37 wherein E is in one resonance extreme comprised of a methylene moiety bonded to a carbonyl, sulfo, or cyano group directly or through a methine chain.

45. A photographic element according to claim 44 wherein E can be represented by the formula:

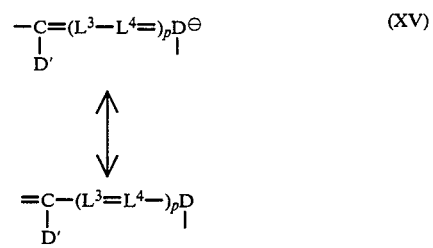

(XV)

wherein

D is a cyano, sulfo, or carbonyl group and
D′ is a methine substituent which can with D complete a five or six membered heterocyclic ring containing ring atoms chosen from the class consisting of carbon, nitrogen, oxygen, and sulfur.

46. A photographic element according to claim 45 wherein E is an acyclic group chosen from among malononitrile, alkylsulfonylacetonitrile, cyanomethyl benzofuranyl ketone, and cyanomethyl phenyl ketone groups.

47. A photographic element according to claim 45 wherein E is a cyclic group chosen from among 2-pyrazolin-5-one, pyrazolidene-3,5-dione, imidazoline-5-one, hydantoin, 2 or 4-thiohydantoin, 2-iminooxazoline-4-one, 2-oxazoline-5-one, 2-thiooxazolidine-2,4-dione, isoxazoline-5-one, 2-thiazoline-4-one, thiazolidine-4-one, thiazolidine-2,4-dione, rhodanine, thiazolidine-2,4-dithione, isorhodanine, indane-1,3-dione, thiophene-3-one, thiophene-3-1,1-dioxide, indoline-2-one, indoline-3-one, indazoline3-one, 2-oxoindazolinium, 3-oxoindazolinium, 5,7-di-oxo-6,7-dihydro-thiazolo[3,2-a]-pyrimidine, cycylohexane-1,3-dione, 3,4-dihydroisoquinoline-4-one, 1,3-dioxane-4,6-dione, barbituric acid, 2-thiobarbituric acid, chroman-2,4-dione, indazoline-2-one, and pyrido[1,2-a]pyrimidine-1,3-dione groups.

48. A radiation sensitive silver halide emulsion comprised of
a dispersing medium,
radiation sensitive silver halide grains, and
adsorbed to the surface of said silver halide grains, a polymethine dye containing as a nucleus thereof an aromatic ring and, fused with said aromatic ring, a tellurazolium ring substituted at its 2-position with a methine chain, where the carbon atom of the methine chain which is in the $\beta$ position with respect to the tellurazolium ring is substituted with a dye property modifier.

* * * * *